May 23, 1967  R. A. FERRARA  3,321,242

SINGLE PIVOT SEAT BACK

Filed Aug. 2, 1965  2 Sheets-Sheet 1

INVENTOR.
Rudolph A. Ferrara
BY
Robert L. Spencer
ATTORNEY

May 23, 1967 R. A. FERRARA 3,321,242
SINGLE PIVOT SEAT BACK
Filed Aug. 2, 1965 2 Sheets-Sheet 2
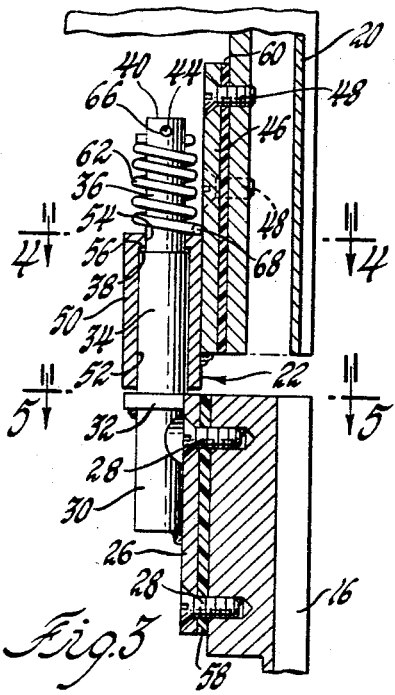
Fig. 3
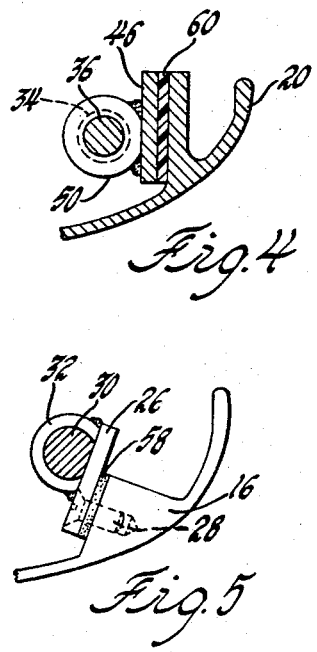
Fig. 4
Fig. 5
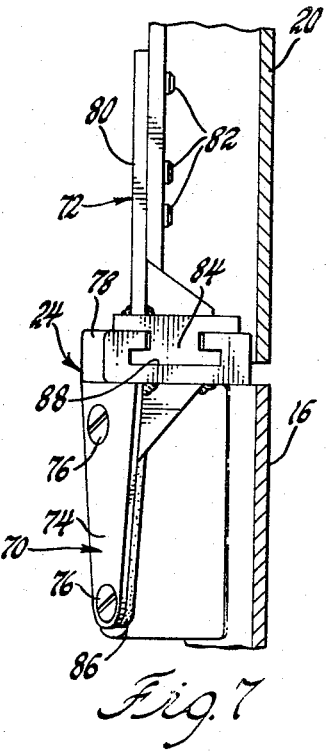
Fig. 7
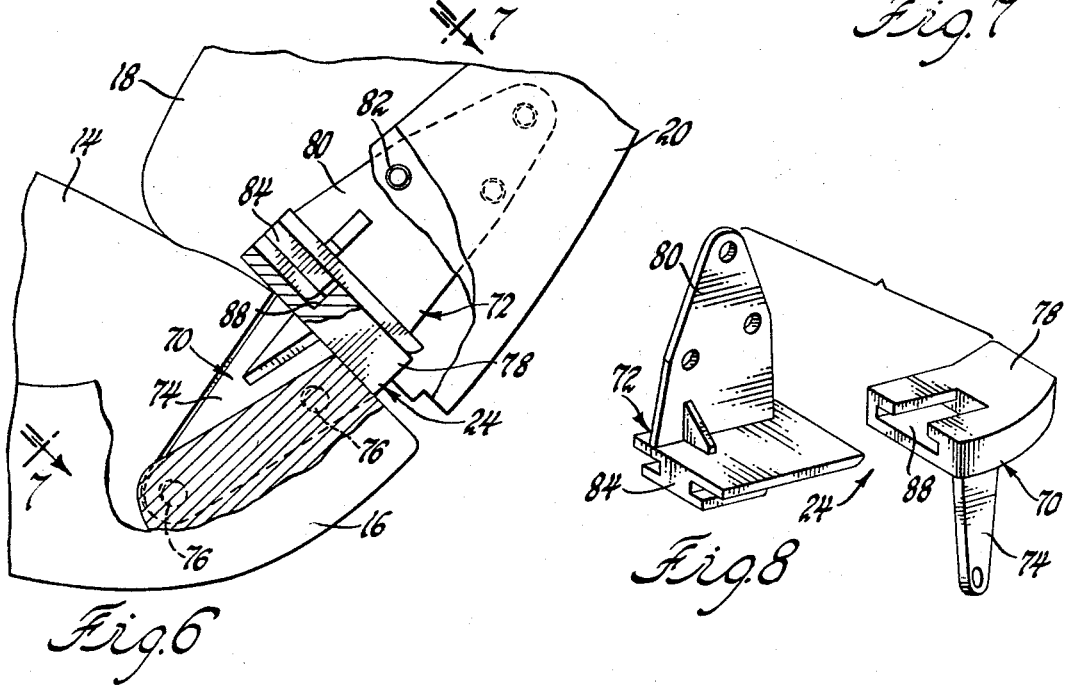
Fig. 6
Fig. 8
INVENTOR.
Rudolph A. Ferrara
BY
Robert L. Spencer
ATTORNEY

United States Patent Office 3,321,242
Patented May 23, 1967

3,321,242
SINGLE PIVOT SEAT BACK
Rudolph A. Ferrara, Warren, Mich., assignor to General Motors Corporation, Detroit, Mich., a corporation of Delaware
Filed Aug. 2, 1965, Ser. No. 476,314
4 Claims. (Cl. 297—353)

ABSTRACT OF THE DISCLOSURE

A vehicle seating unit having a single inboard hinge joining the seat and seat back. The pintle of the hinge is inclined to permit the seat back to pivot upwardly and inwardly so as to allow easier entrance to the rear seat of a conventional two-door vehicle. A latch assembly secures the outboard corners of the seat and seat back in the seat-forming position.

---

A common problem in the construction of conventional two-door vehicles in which a rear seat is utilized for carrying passengers, is the necessary compromise between an excessively large door opening and a folding seat back of the front seat to permit the passengers entrance into the rear seating area. With the advent of the "compact" cars, and the lower silhouette regular cars, the proportionate size of the door openings must of necessity be reduced. The conventional two-hinged seat back, in some instances, does not provide sufficient room for easy entrance to the rear seating area.

Concealed hinging of a seat back using conventional hinges are limited in the design of the seat and seat back bolsters and/or the hinges. The usual result is a compromise in the design of each resulting in hard areas in the bolsters adjacent the hinges and insufficient clearance for entrance to the rear seating area.

It is an object of this invention to provide a single pivot seat back which provides improved clearance for entrance to the rear seating compartment and also provides a comfortable seat back.

Another object of this invention is to provide a single pivot for a seat back which is positioned at the inboard edge of the seat back and upon movement of the seat from the seat-forming position to an easier entrance position causes the outer edge of the seat back to be raised as it is pivoted forwardly and inboard of the seat edge.

A further object of this invention is to provide an inclined hinge pintle for a single inboard hinge of a seat back in which the outer edge of the seat back will be raised as it is pivoted forwardly from its normal seat-forming position to a sufficient height to clear seat bolsters presently used in "bucket" seats.

Another object of this invention is to provide a front seat for a two-door vehicle with a rear seating area having a single pivot hinge for one side of the front seat back and a locking means for the other side whereby the seat back is rigid in the seat-forming position and may be easily pivoted about the hinge to permit easy entrance to the rear seating area.

A further object of this invention is to provide a latching means for securing the outer edge of a seat back in seat-forming position when a single pivot is used on the inner edge of the seat back for pivoting the seat back between a seat-forming position and an easier entrance position.

These and other objects will be apparent as reference is made to the following specification and drawings wherein:

FIGURE 3 is a view in the direction of the arrows substantially along the line 3—3 of FIGURE 2 showing the manner in which the inclined hinge is secured to the seat frame and the seat back frame.

FIGURE 4 is a view in the direction of the arrows substantially along the line 4—4 of FIGURE 3 showing the cross section of the hinge in the seat back.

FIGURE 5 is a view in the direction of the arrows substantially along the line 5—5 of FIGURE 3 showing the cross section of the hinge and seat.

FIGURE 6 is a view in the direction of the arrows substantially along the line 6—6 of FIGURE 1, with sections cut away to illustrate the latch for securing the outer edge of the vehicle seat in the seat-forming position.

FIGURE 7 is a view in the direction of the arrows substantially along the line 7—7 of FIGURE 6 illustrating the manner in which the outboard latch assembly is secured to the seat frame and the seat back frame.

FIGURE 8 is an isometric view of the outboard latch assembly showing the lock bar and keeper.

Figure 1:
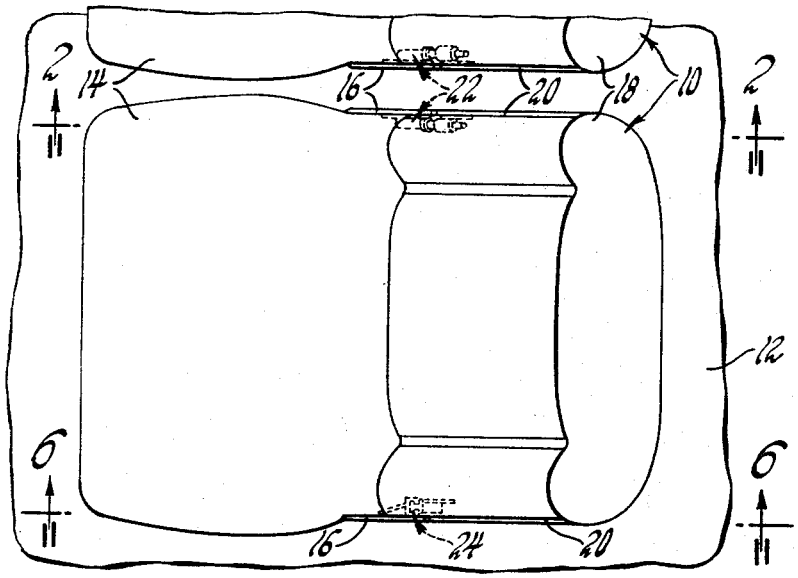
FIGURE 1 is a plan view with sections broken away of a bucket seat mounted in a vehicle body.
Figure 2:
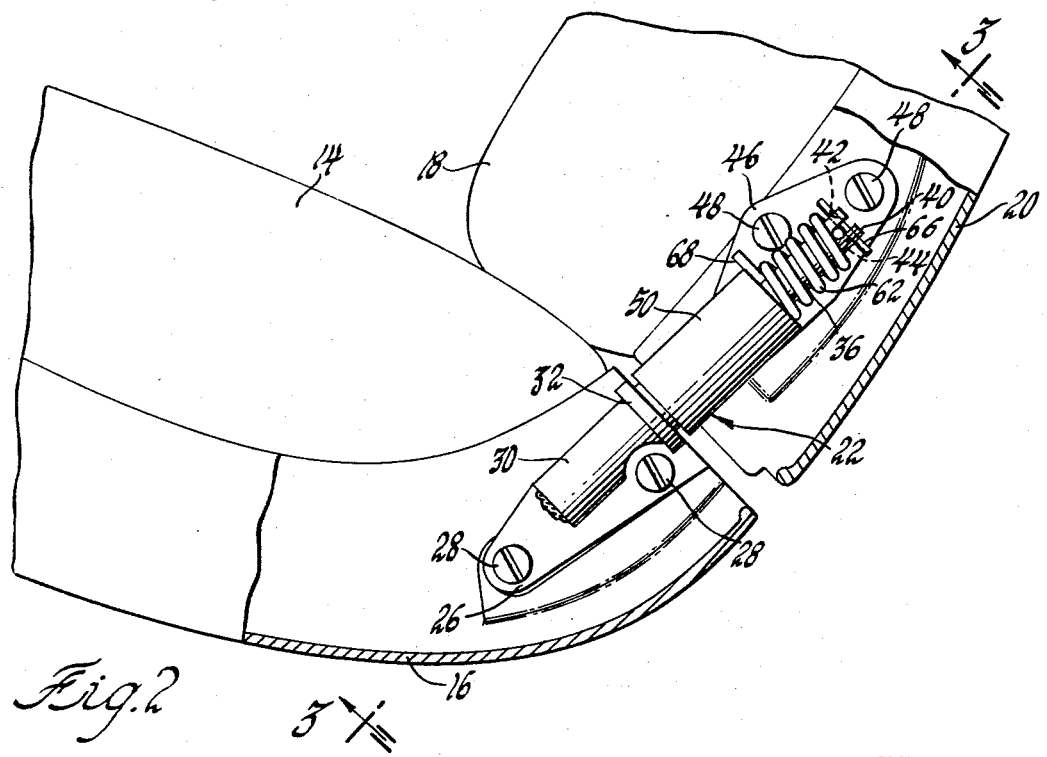
FIGURE 2 is a view substantially along the line 2—2 of FIGURE 1, with sections broken away, and illustrating the inclined pintle hinge of the present invention.

The embodiment shown in the drawings is for a bucket seat application but the invention may be readily applied to the conventional bench type seat with a split back. In this illustration, two bucket seats are shown positioned side by side in a vehicle body. The identical hardware is used on each seat except that they are opposites. For ease of explanation, identical numbers will be used to identify similar parts in each seat.

Referring now to the drawings, as best seen in FIGURE 1, a bucket seat assembly indicated generally by the numeral 10 is mounted in a vehicle body 12. The bucket seat assembly 10 includes a seat cushion 14 mounted on a seat frame 16 and a seat back cushion 18 supported on a seat back frame 20. The seat frame 16 and seat back frame 20 are joined in a seat-forming position by an inboard hinge assembly 22 and an outboard latch assembly 24.

As best seen in FIGURES 2–5, the hinge assembly 22 includes a hinge pin mounting bracket 26 secured to the seat frame 16 by metal screws 28 or other suitable means such that a hinge pin 30 secured thereto is positioned approximately 45° from the horizontal when viewed from the side and vertical when viewed from the front. The hinge pin 30 is welded or suitably secured to the mounting bracket 26 with a hinge pin collar 32 welded thereabout and to the bracket 26 to better secure the pin to the bracket.

The hinge pin 30 must be inclined away from the seat at an acute angle to the approximately horizontal plane of the seat in the quadrant defined by the horizontal plane of the seat, a plane normal to the seat plane and parallel to the side of the seat on which the hinge is mounted and a plane normal to the horizontal plane of the seat and normal to the side plane and parallel to the rear edge of the seat such that the intersection of the three planes is the point from which the hinge pintle extends at an acute angle.

The portion of the hinge pin 30 extending from the collar 32 and bracket 26 is divided into two sections 34, 36 having different diameters. Section 34 having a larger diameter than section 36 and being adjacent the collar 32 acts as the pintle for the hinge 22. A shoulder 38 is formed at the point where the diameter of section 34 is reduced to the diameter of section 36. The smaller diameter section 36 has a bifurated end portion 40 with aligned holes 42, 44 in each leg thereof.

A hinge sleeve mounting bracket 46 is attached to the seat back frame 20 by metal screws 48 or other suitable means. A hinge sleeve 50 is welded or suitably secured to the sleeve mounting bracket 46. The hinge sleeve 50 has a stepped inner diameter with the larger diameter 52 slightly larger than the diameter of section 34 of the hinge pin and the smaller diameter 54 slightly larger than the diameter of section 36 thus providing a slip fit of sleeve 48 on hinge pin 30. A shoulder 56 is formed between diameter 52 and diameter 54 for cooperating with shoulder 38 of hinge pin 30 for supporting the seat back 18. Shims 58, 60 may be used as needed between the mounting brackets 26, 46 and their respective frames 16, 20 to assure the hinge sleeve 50 is aligned with the hinge pin 30.

A torsion spring 62 is positioned about section 36 of the hinge pin 30. One end of the spring 62 is positioned in the bifurcated end 40 of the hinge pin 30 and is secured therein by a retaining pin 66 extending through the aligned holes 42, 44. The other end 68 of torsion spring 62 extends tangentially from section 36 and contacts mounting bracket 46. During assembly, spring 62 is "wound-up" so that in assembled position, a biasing force urges the seat back 18 to be pivoted forwardly from its seat-forming position toward the easy entrance position. This biasing force assists in moving the seat back to the easy entrance position and resists return of the seat back to the seat-forming position, thus helping to counter balance the weight of the seat back during movement thereof.

Referring now to FIGURES 6 through 8, the latch assembly 24 for securing the outer edge of the seat back 18 in seat-forming position is clearly illustrated. As best seen in FIGURE 8, the latch assembly 24 includes a keeper portion 70 and a lock bar portion 72.

The keeper portion 70 has a keeper mounting bracket 74 that is secured to the seat frame 16 by metal screws 76 or other suitable means. The lock bar keeper 78 is secured to the keeper bracket 74 by welding or other suitable means.

A lock bar mounting bracket 80 is secured to the seat back frame 20 by metal screws 82 or other suitable means. A T-shaped lock bar 84 is secured to the lock bar plate 80 by welding or other suitable means.

A shim 86 may be positioned between keeper mounting plate 74 and the seat frame 16 as required to align the T slot 88 of the keeper 78 with the T-shaped lock bar 84.

When the seat back 18 is pivoted about the hinge assembly 22 from the seat-forming position shown in FIGURE 1 and FIGURE 6, the T-shaped lock bar 84 is moved from the keeper slot 88. When the seat back 18 is pivoted back to a seat-forming position, the T-shaped lock bar 84 seats in the T-shaped slot 88 of the keeper assembly 70 and prevents further rotation of the seat back beyond seat-forming position.

If desired, a locking means of conventional design may be employed to retain the T-shaped lock bar 84 seated in the keeper assembly 70 while in the seat-forming position. Such a locking means is not necessary since the weight of the seat back 18 will normally keep it in the seat-forming position.

In operation, as the seat back 18 is pivoted from the seat-forming position to the easier entrance position about the inclined pintle 34, the outer edge of the seat back 18 will be raised as it is pivoted forwardly thus clearing the bolster of a bucket seat and providing improved clearance for entrance to the rear seating compartment. The use of an inclined pintle single pivot seat back permits greater latitude in both the designs of the seat and seat back since there is no problem of clearance between the back and the cushion bolsters when the seat is pivoted for easier entrance.

The single pivot seat back eliminates hard areas in the bolsters commonly encountered with a conventional two-hinged seat back by permitting more freedom in the design of the bolsters since the problem of clearance between the seat back and the bolsters is eliminated.

While but one embodiment of this invention has been illustrated and explained, it is obvious that variations may be made without departing from the spirit and scope of the claims.

I claim:
1. In combination in a vehicle body having a door on one side, front and rear seat units, a front seat unit mounted therein adjacent said door and having a seat-forming position and an easy entrance position, said front seat unit including a seat portion mounted in said vehicle body and a seat back portion pivotally secured to said seat portion, the rear edge of said seat portion being adjacent the bottom edge of said seat back portion in said seat forming position, a single hinge pivotally connecting the bottom edge of said seat back portion most remote from said door and the adjacent rear edge of said seat, said hinge having an inclined pintle secured to one of said seat unit portions, a hinge sleeve pivotably mounted on said pintle and secured to the other of said seat unit portions, a torsion spring having one end secured to said pintle and the other end bearing against the other of said seat unit portions for biasing said seat back portion toward said easy entrance position, and means for limiting pivotal movement of said seat back portion about said hinge.

2. Apparatus as claimed in claim 1 wherein said inclined pintle is inclined toward the rear of said vehicle body in a plane normal to said body and extending longitudinally therethrough whereby forward pivotal movement of the seat back portion about said hinge pintle will cause the outer edge of said seat back portion adjacent said door to be raised and to move inwardly from said door over the seat portion.

3. In combination in a vehicle body having front and rear seating units mounted therein, a door adjacent said front seating unit, said front seating unit including a seat and a seat back, said seat being in a substantially horizontal plane, said seat back having a seat-forming position and a pivotal easy entrance position and being movable therebetween, spring assist means biasing said seat back toward said easy entrance position, a latch assembly for securing said seat back in said seat-forming position and a single hinge pivotally connecting said seat back to said seat including a pintle inclined rearwardly and lying in a substantially vertical plane whereby forward pivotal movement of said seat back portion from said seat-forming position to said easy entrance position about said hinge will cause said seat back portion to be pivoted in an arcuate path upwardly and inwardly over said seat.

4. A seating unit having a seat-forming position, an easy entrance position and being adjustable therebetween, said seating unit including a seat portion and a seat back portion substantially at a right angle and movable relative to said seat portion, the back edge of said seat portion being contiguous with the lower edge of said seat back portion in said seat-forming position, spring means biasing said seat back portion to said easy entrance position, latching means for securing one rear corner of said seat portion and the adjacent lower corner of said seat back portion in said seat-forming position, and a single hinge pivotally joining the other corner of said seat portion and the other adjacent lower corner of said seat back portion including a pintle secured to one portion of said seating unit and a hinged sleeve movably supported on said pintle and secured to the other portion of said seating unit, the axis of said pintle being in a quadrant upwardly and away from said seating portion at an acute angle from the juncture of three planes defining the quadrant, said quadrant having a first plane through the supporting surface of said seat portion, a second plane normal to said first plane and parallel to the supporting surface of said seat back portion and a third plane normal to said first and second planes and passing through the pintle whereby forward pivotal movement of said seat back portion from seat-forming position to said easy entrance position about said hinge will cause the said seat back portion to be pivoted in an arcuate path upwardly and forwardly over said seat.

(References on following page)

References Cited by the Examiner

UNITED STATES PATENTS

| | | | |
|---|---|---|---|
| 3,020,088 | 2/1962 | Haltenberger | 297—357 |
| 3,028,198 | 4/1962 | Murr | 297—379 X |
| 3,028,199 | 4/1962 | Beierbach et al. | 297—379 |
| 3,044,830 | 7/1962 | Kolle | 297—361 |
| 3,123,401 | 3/1964 | Komenda | 297—379 |
| 3,156,004 | 11/1964 | Strien et al. | 297—367 |

DAVID J. WILLIAMOWSKY, *Primary Examiner.*

FRANK B. SHERRY, *Examiner.*

G. O. FINCH, *Assistant Examiner.*